Jan. 28, 1947.　　　　L. A. THOMPSON　　　　2,415,051
METHOD AND APPARATUS FOR MAKING COLOR SEPARATION NEGATIVES
Filed Nov. 19, 1941　　　3 Sheets-Sheet 1

Fig. 1

INVENTOR.
LOUIS A. THOMPSON
BY Richey & Watts
ATTORNEYS

Jan. 28, 1947. L. A. THOMPSON 2,415,051
METHOD AND APPARATUS FOR MAKING COLOR SEPARATION NEGATIVES
Filed Nov. 19, 1941 3 Sheets-Sheet 2

INVENTOR.
LOUIS A. THOMPSON
BY Richey & Watts
ATTORNEYS

Jan. 28, 1947.   L. A. THOMPSON   2,415,051
METHOD AND APPARATUS FOR MAKING COLOR SEPARATION NEGATIVES
Filed Nov. 19, 1941   3 Sheets-Sheet 3

INVENTOR.
LOUIS A. THOMPSON
BY Richey & Watts
ATTORNEYS

Patented Jan. 28, 1947

2,415,051

UNITED STATES PATENT OFFICE 2,415,051

METHOD AND APPARATUS FOR MAKING COLOR SEPARATION NEGATIVES

Louis A. Thompson, Rocky River, Ohio, assignor to NEA Service, Inc., Cleveland, Ohio, a corporation of Delaware Application November 19, 1941, Serial No. 419,754

21 Claims. (Cl. 178—5.2)

This invention relates to the reproduction of pictures in natural color, and more particularly relates to a method and apparatus for the making of color separation negatives from a colored original. The colored original may be a transparency, although the invention is by no means limited to the use of a transparency for making the negatives since negatives can be made from colored prints.

The art of making separation negatives has progressed to that point where the general principles are so well known to those versed in the art as to require no lengthy discussion thereof herein. Suffice to say, that in the case of preparing them from a transparency they are ordinarily prepared by exposing separate pieces of panchromatic negative material by passing light through the transparency. The light which falls on the negative material may be filtered either before or after passing through the transparency by the use of suitable filters to cause the separate films to each be exposed by a different value of light. These filters are normally red, blue and green although the spectral qualities of the particular filters may vary depending upon the ultimate process used for making the final colored print. That is, certain filters may be sharp cut-off filters which pass only a relatively narrow portion of the spectrum, whereas other filters may pass relatively wide spectral bands to provide some overlap in the portions of the spectrum passed. The negatives thus made are in turn used to make positives or prints, which positives are used to make in complementary colors to the colors of the filters the final print. That is, the red separation negative is used to make the cyan or blue green printer, the green separation negative is used to make the magenta or red printer, and the blue separation negative is used to make the yellow printer. In the case of the magazine and newspaper productions a fourth separation negative is often made which is called a black printer. The black printer adds snap and brilliance to a picture which might otherwise lack the proper degree of contrast and have a faded or washed out appearance.

Due to the fact that the ultimate printing mediums such as inks, vary from time to time and also that it is difficult if not impossible to obtain printing inks of the proper spectral reflection from the printed page to provide a true reproduction, some correction is often desirable in the negatives which correction is reflected in the final print to make the color reproduction more natural. Sometimes this correction is desirable from the standpoint of emphasizing certain colors or to subdue certain colors all with a view to making the final print more pleasing to the eye. This correction is usually accomplished immediately after the making of the separation negatives, although some correction can be made in the final printing. One common method of effecting this color correction is by what is known as a masking process which ordinarily requires the making of light positives which are used in conjunction with the separation negatives to provide the desired results. For example, positive transparencies of low contrast are prepared, two of which are made from the red filter negative, and one from a yellow filter negative. One of these red filter positive transparencies is combined with the green filter negative and provides a mask, the combination being used for the making of the magenta positive printer. The yellow filter mask is combined with the blue filter negative to make the yellow printer, and the other red filter mask is used with the red filter negative to flatten the cyan printer. This system is all well known and fully described in current literature, and is only briefly touched upon here since, as will hereinafter more fully appear, this masking can be automatically accomplished in making the original negatives.

Numerous systems have heretofore been proposed for mechanically forming separation negatives, but so far as I am aware they have met with but little actual success due to the extreme complexity of the operations and the difficulty of obtaining consistent results.

In the present invention I have provided an improved mechanism and apparatus for scanning the picture to be reproduced, which in a large measure eliminates certain mechanical errors apt to be present and inherent in the prior devices. Furthermore, it is possible to so control the operation of the component parts of the apparatus as to make it possible to adjust the apparatus to certain predetermined output and to reproduce consistent results. The apparatus may be operated by relatively unskilled workers since reliance need not be placed upon judgment born of long experience in controlling the various operations.

It is, therefore, an object of my invention to provide an improved method and apparatus for the making of color separation negatives.

Another object of the invention is to provide a new and improved method and apparatus for scanning, especially useful in reproduction of pictures in color.

Another object of the invention is to provide a machine for making color pictures which may also be controlled to make positive printers directly from the color picture and eliminate the making of the negatives.

Another object of the invention is to provide an apparatus by means of which either separation negatives may be made or by which positives may be made.

Another object of the invention is to provide a new method of scanning wherein the colored picture is scanned by a single scanning source and wherein the films being exposed are all exposed in corresponding portions simultaneously.

Another object of the invention is to provide a single scanning means which simultaneously scans the picture for the primary colors as well as for the black printer.

Another object of the invention is to provide a machine whereby during the making of the negatives or the positives a suitable masking effect can be obtained to provide certain desired spectral corrections.

Another object of the invention is to provide a machine for making separation negatives or the like where the density of the reproductions can be electrically controlled.

Still other objects of my invention reside in the extreme simplicity and economy effected by the new method of scanning, these and other objects of the invention and the invention itself will become more apparent from the following description of an embodiment thereof, which description is illustrated by the accompanying drawings and forms a part of this specification. Although the invention is described particularly in connection with a machine for making separation negatives wherein the machine including the scanning and exposing units are all in one assembly, the invention is not limited to the entire machine per se since the scanning unit and system described is also useful in sending signals over a transmission line, or by other means of communicating intelligence, to permit the reproduction of separation negatives at some remote point.

In the drawings.

Figure 1:
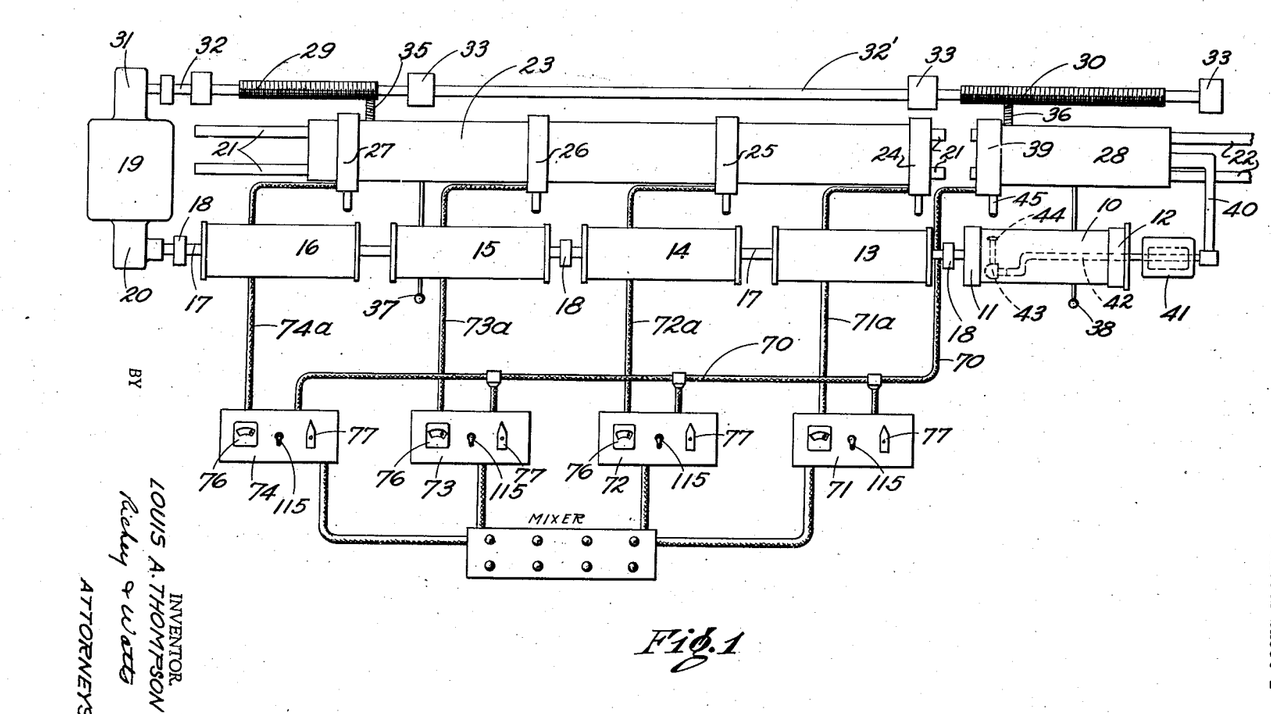
Fig. 1 is a diagrammatic plan view of a machine for making color separation negatives.

Referring now to the drawings throughout which like parts have been designated by like reference characters and more particularly to Fig. 1.

Briefly, the apparatus contemplates a plurality of rotatable drums one of which is transparent and is adapted to hold a colored transparency and the others, of which in this instance there are four, adapted to hold the sheets of negative material. All of these drums are driven by a common shaft. An optical unit is provided for each of the drums, those for the negative drums being the exposure units and that for the transparency drum being a scanner unit. The negative exposure optical units are supported on one carriage, and the scanner unit on a separate carriage, all adapted to be moved longitudinally with respect to the drums the exposure units in one direction and the scanner unit in the other, by a lead screw driven synchronously with the drive for the drums.

More particularly, the scanning drum is illustrated at 10 and may constitute a transparent hollow cylinder supported by end bells 11 and 12. The drums for holding the sheet films for the separation negatives are indicated at 13, 14, 15 and 16. They are not necessarily transparent nor for that matter need they be separate drums since one long drum could be used effectively. The negative drums and the scanner drum are supported and rotated by a shaft 17, which is journalled in bearings 18 at the left end and between the separate drums. Since the drum 10 is adapted to have an exciter unit movable therein through the end, the end bell 12 is journalled at its periphery in bearings and the drive shaft 17 terminates at its connection to the end bell 11. A motor 19 for driving the drums at a predetermined speed is connected to the shaft 17 through a reduction gearing 20.

The exposure units and scanning system are arranged to move longitudinally with respect to the drums while the drums are rotating to provide a helical exposure and scanning path of the negatives and transparency. In carrying out this movement pairs of tracks 21 and 22 are provided which extend alongside the drums in spaced parallel relation thereto. Upon the tracks 21 is disposed an elongated reciprocable carriage 23, which carriage carries the optical exposure units 24 to 27 inclusive which are used to expose the negative material. The other tracks 22 which extend in prolongation to the tracks 21 have reciprocally disposed thereon the scanner carriage 28.

Lead screws 29 and 30 are provided for moving the carriages, being supported in bearings 33 at their ends and connected to each other by the shaft 32'. The lead screws are rotated by a reduction drive 31 from the motor 19 through the shaft 32. The lead screws extend parallel to the axis of the drums, the lead screw 29 being opposite the cylinder 16 and having a right hand thread, while the lead screw 30, which has a left hand thread thereon, is opposite the scanner cylinder 10. This construction permits the respective carriages for the exposure units and scanner units to be moved in opposite directions. Should it be desired to move both carriages in the same direction they can be directly connected to each other, in which event only one lead screw would be used to move the two carriages.

The carriages are provided with half nuts 35 and 36 adapted for movement into and out of engagement with the lead screws 29 and 30 respectively, engagement of said nuts with said shafts being effected through the manual control levers 37 and 38.

In the scanner section of the apparatus, the carriage 28 supports the scanning optical unit indicated generally at 39. An arm 40 is provided which extends laterally from the carriage 28 over to and opposite the open end of the cylinder or drum 10, the arm then extends parallel to the axis of the drum at 42 into the drum. The end of the arm 42 carries an exciter unit which includes a light source 43 and a condenser lens 44. The arm 42 is supported in and is reciprocable in a bearing support 41. The exciter unit 43—44, together with the scanning optical unit 39, travel together and the light from the exciter unit is adapted to pass through a film disposed on the drum which light is picked up by the scanning optical unit.

Figure 2:
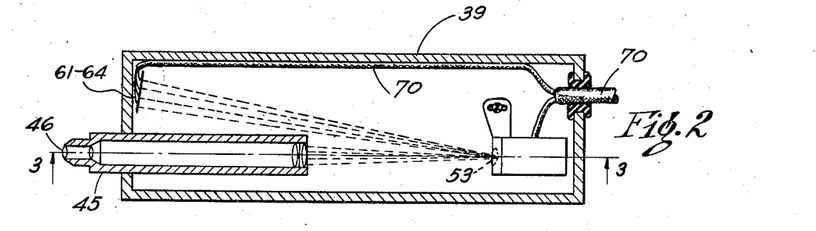
Fig. 2 is a horizontal section of the color separation scanning and optical unit used in the machine.
Figure 3:
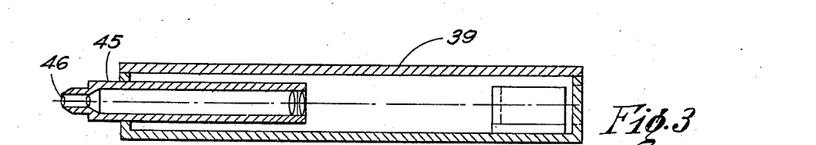
Fig. 3 is a section taken from a plane indicated by the line 3—3 of Fig. 2 and illustrating the interior of the optical unit of Fig. 2.
Figures 4, 6, 7, 8, 9, 10:
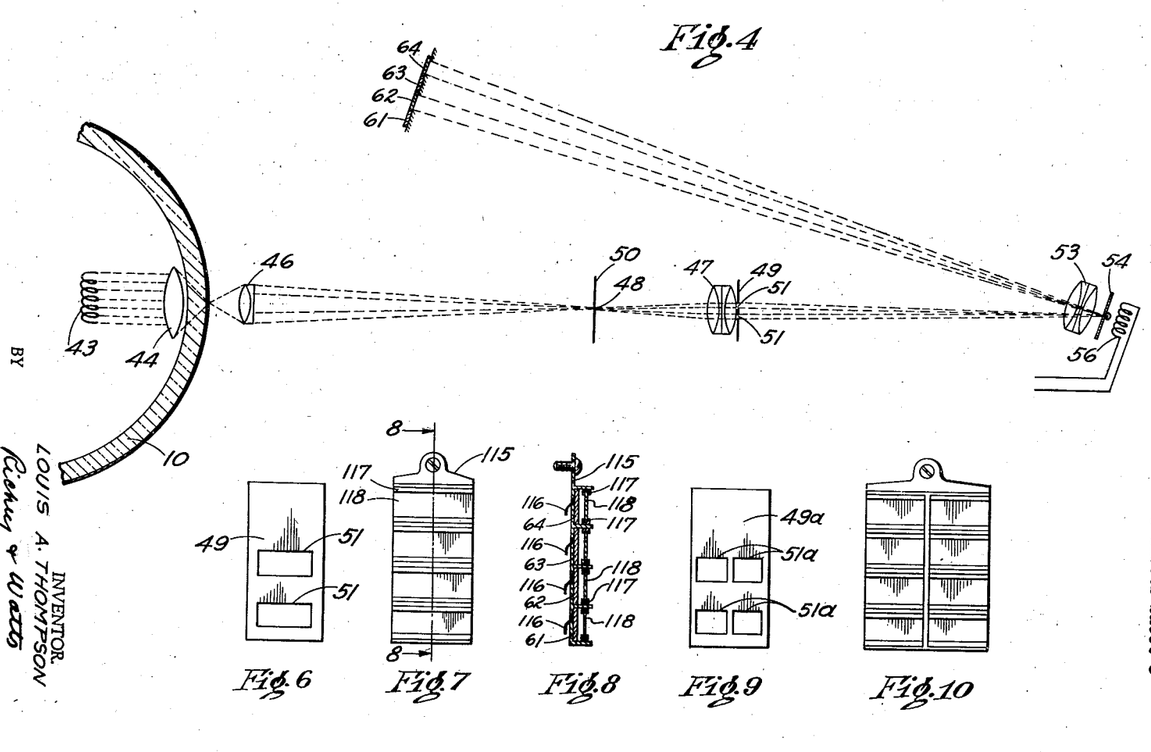
Fig. 4 is an enlarged diagrammatic view showing the arrangement of the optical system in the scanner head, a fragment of the scanner drum and exciter unit being also shown.
Fig. 6 is a plan view of a beam forming mask.
Fig. 7 is an elevational view of the photocells and filters.
Fig. 8 is a side view of the photocells and filters.
Fig. 9 is a view of a modified form of beam forming mask.
Fig. 10 is a view of a modified arrangement of photocells and filters.

The exposure optical units 24 to 27 inclusive may be substantially the same in principle and operation as that disclosed in the receiving portion of my co-pending application, Serial No. 334,371, filed May 10, 1940. The scanning optical unit is best illustrated in Figs. 2, 3 and 4.

The light rays from the filament of the exciter lamp 43 are focused by the condenser lens 44 so that they converge to a point in the emulsion of the colored transparency which is secured on the drum 10. This is best shown by the diagram in Fig. 4. The light passes through the emulsion and is picked up by the lens system of the optical scanning unit 39. The optical scanning unit which is mounted on the carriage 28 includes a housing which contains the light sensitive cells, oscilloscope and lens system. In the scanning unit the light shining through the transparency is caused to fall on photo sensitive cells, which are each sensitive to certain spectral colors, which causes currents to be generated therein and which currents are used to control the exposure units.

The lens system of the optical scanning unit includes the lens tube 45 in which is disposed the lens elements and which extends from the housing to a point spaced from the film on the drum 10. The lens system includes a lens element 46 which is in the end of the tube and picks up the rays of light passing through the transparency and causes the rays to converge and cross over at 48 after which they are picked up by the element 47. A halation mask 50 may be provided at the cross over point to restrict the amount of scattered light in the system. They then pass thru a mask 49 disposed on the inner end of the tube 45. This mask, Fig. 6, is provided with two apertures 51 which divide the rays into two beams. These beams will have equal spectral components because of the position of the mask. The beams pass from the mask longitudinally in the optical unit housing and through a lens 53 disposed in front of the oscilloscope mirror 54. After they strike the mirror they are reflected back through the lens 53 toward the other end of the housing where they fall onto the photo electric pickup cells 61 to 64 inclusive.

The optical system is so arranged in the mask 49 as to form images of the openings 51 on the photo cells. The photo cells 61 to 64 are arranged in a row adjacent to each other as best shown in Figs. 7 and 8. One of the cells is sensitive to red, another to green, a third to blue, and a fourth sensitive to all colors. The sensitivity of the cells may be controlled in several ways. In one instance the cells themselves are constructed of materials each of which is sensitive to a certain part of the spectrum. In another instance, which is illustrated best in Fig. 8, the photo cells are all of the same material and their sensitivity is controlled by interposing filters in front of each cell. The cells are preferably supported in a holder 115 which is insertable or removable from the optical system as a unit. In this instance a holder for the cell unit would be secured in the housing and provided with contact fingers 116 connected to the cells, which fingers would engage contacts on the support for the holder. These fingers would in turn be connected by conductors 70 to the various amplifiers. The cell unit would be provided with guiding flanges 117 into which the desired filters 118 may be slid to thus control the exact output of each cell for a certain spectral band. The cells may be shaped to the same contour as the images formed by the mask and are so arranged and coordinated with the light beams that each of the beams falls on a separate cell at one time. This is effected by proportioning each beam so that it substantially covers but one cell without overlap and since the two beams are spaced apart each beam then falls on alternate cells at opposite phases of the oscilloscope swing. This is accomplished by adjusting the lens system and oscilloscope without a signal on the oscilloscope so that normally one of the beams lies one-half way onto the red and green cells 61—62 and the other beam half way onto the blue and black cells 63—64. When an oscillating current is applied to the oscilloscope windings 56 it is arranged to be of such a value that the beams during one-half of the cycle are swung to cover only the red 61 and blue 63 cells at the peak of this swing and the green 62 and black 64 cells are without light. During the other half of the cycle the beam swings in the other direction, moving off of the red and blue into the green and black respectively, and during the peak of the wave the red and black cells are without light. In this manner with a 2253 cycle signal applied to the oscilloscope the beams are swung 2253 times per second onto each cell. Thus with white light passing through the unit each cell would be developing a maximum current which comprises 2253 D. C. pulses per second. These pulses of current may then be converted to a full wave form of signal in an amplifier where the other half cycles are added through the well known fly wheel effect of the amplifier. The current from each cell is then fed through the cable 70 to the amplifiers 71 to 74 respectively where the current of each cell is amplified to the proper determined level. Each amplifier may be provided with appropriate volume indicator 76 and the gain of each amplifier may be controlled in any well known manner; the control knob for controlling the gain being indicated at 77. For the purpose of clarity the drawings illustrate the separate amplifier units as being contained in separate housings; 71 being for red; 72 for green; 73 for blue; and 74 for black. It will be appreciated, however, that these units could and probably would be combined in a single housing or on a single panel. Each amplifier is connected by a cable 71a, 72a, 73a and 74a to the respective exposure heads.

Each of the exposure drums carries a piece of unexposed negative material which is adapted to the light from the exposure units. Obviously the units can be provided with a suitable housing to exclude extraneous light and permit the operations to be carried out after the exposure drums are once loaded, in a lighted room.

Figure 11:
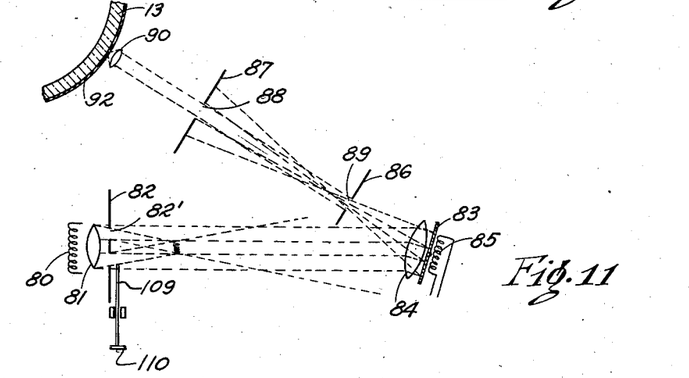
Fig. 11 is a schematic view of one of the exposure heads.

Each of the exposure heads as illustrated diagrammatically in Fig. 11 includes a light source 80, the light rays from which pass through a condenser lens 81 and thence through a beam forming mask 82, after which the image of the filament of the light source falls on the mirror 83 of the oscilloscope. Prior to striking the oscilloscope the rays pass through the lens 84. The winding 85 of the oscilloscope is connected to one of the amplifiers such as 71 and is operable to swing the oscilloscope mirror. After striking the mirror the beam is reflected back through the lens 84 through a spot forming mask 86 and onto a shutter mask 87. The lens system 84 is designed to look at the beam forming mask 82 in such a manner that images of the openings 82' of this mask are focused on the shutter mask 87. The beam forming mask is similar to that shown in Fig. 6 and comprises a flat plate having a pair of spaced rectangular apertures 82' therein. The apertures may be other than rectangular in formation, however. The shutter mask 87 is provided with an opening 88 which may be substantially the same size as the image of the beams. The spot forming mask 86 is interposed after the light passes through the lens system 84 and is provided with an opening 89, the contour of which eventually determines the shape of the spot on film being exposed. After passing the shutter mask 87 the beams during operation pass through the objective lens system 90. This lens system 90 is arranged to look at the opening 89 in the spot forming mask 86. The drum 13 carries thereon a sensitive material 92 disposed opposite the lens system 90 at the focus where the rays form the image of the spot forming mask 89.

In operation the oscilloscope is so adjusted that the beams formed by the mask 82 and imaged by the lens system 84 on the shutter mask 87 are disposed (with the oscilloscope de-energized) on opposite sides of the opening 88. When the signal is applied to the winding 85 the oscilloscope swings the two beams so that during one-half of the cycle one beam swings into the opening 88 and during the other half of the cycle the other beam swings into the opening 88. The magnitude of the swing of the beams into the opening is dependent upon the amplitude of the oscilloscope current. That is, on a strong signal the whole beam swings in and on a weak signal only a proportionate part swings in.

As previously mentioned, the cylinder 13 carrying the film 92 was placed at the point where the image of the spot forming mask focuses. This has a peculiar effect in that since the lens 90 is looking at the opening 89 rather than at the openings 82' of the beam forming mask, the spot of light on the film remains of constant size and formation but varies in intensity according to the amount that the beam swings into the opening 88. Therefore, the exposure effected is a ribbon-like exposure comprising a plurality of rectangular exposure areas disposed on the film in a helical path.

It should also be noted that although the oscilloscope is arranged to swing these beams the square of light does not swing across the scanning line, and that the light enters the apertures in the direction of scanning. The effect of this on the exposure has been clearly described and illustrated in my aforementioned co-pending application.

Figure 5:
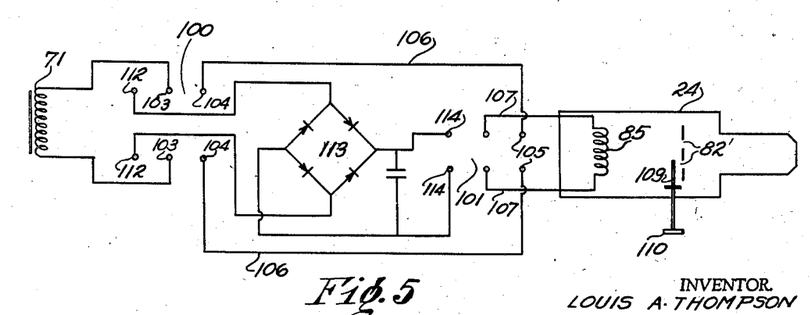
Fig. 5 is a schematic view of a reversal network for the exposure units.

As previously stated it is contemplated that the apparatus may be used for making direct positives. That is, the transparency can be used and without the necessity of making intermediate separation negatives, direct positives can be made. In this event each of the amplifiers 71 to 74 is provided with a reversal network one of which is illustrated diagrammatically in Fig. 5. Here the output from the amplifier 71 is connected through double pole double throw switches 100 and 101 which are ganged together. The input to this circuit is from the amplifier 71 to the center terminals 103, these in turn being connected to the terminals 104 and by the connectors 106 to the terminals 105 of the other section of 101 of the gang switch. Center terminals of the switch 101 are connected directly to the exposure head 24 input through the wires 107. For normal operation the current is thus fed directly from the amplifier to the oscilloscope. When, however, it is desired to make a positive, one of the apertures 82' of the beam forming mask 82 is closed off by a shutter 109 under control of the knob 110. The oscilloscope is moved so that the mirror 83 reflects the single remaining beam full into the aperture 88 of the shutter mask to provide maximum exposure on the signal. The gang switch 101 is thrown to its alternative position in which the output from the amplifier 71 is connected to the terminals 112 and thence into a bridge rectifier 113. The output of the bridge rectifier is then coupled through the terminals 114 to the center terminals of the switch 101 and thence directly to the oscilloscope winding 85 of the exposure head 24. The signal from the amplifier which may be a 2253 cycle sine wave is converted in the bridge rectifier to a pulsating signal of 4506 pulsations per second each of which causes the oscilloscope mirror 83 to swing the beam out of the opening of of the shutter mask at the highest amplitude of the signal. Thus the signal causes the exposure to decrease on higher amplification and results in the making of a direct positive. The control for the gang switch is illustrated at 115 in Fig. 1.

As best shown in Fig. 9, there is illustrated a beam forming mask 49a having two pairs of beam forming apertures 51a which provide two pairs of beams. Each pair of beams operates in substantially the same manner as that described. This beam forming mask is designed particularly to operate with a dual bank of cells which comprises four cells in a row in two rows, as best shown in Fig. 10. The cells are mounted in substantially the same manner as described and the desired filters may be placed in front of each cell. In this instance there would be four beams, two of which would swing up and down across the cells on one side, and the other two of which would swing up and down across the cells on the other side, the beams all operating in unison.

I have previously mentioned the ease with which masking may be accomplished. Inasmuch as there are two beams scanning four cells, two of which are scanned simultaneously and two of which are scanned intermediate the scanning pulses for the other two, the currents from the cells can be considered in phase while with respect to the currents from the other two cells are 180° out of phase. It will thus be seen that two of these currents may be used to knock down the signal from the other two currents any predetermined amount because they are 180° out of phase. This, as will readily appear, is useful because it is possible to use any portion of the current with its strength controlled and predetermined to feed into one of the other amplifiers, particularly any one where the currents are out of phase, to have that current oppose the signal being introduced into that amplifier to provide desired masking.

In event that only two of the cells are going to be used to supply masking current, the characteristics of these cells can be predetermined to provide the 180° out of phase current by simply changing the filters. That is, assuming for the purpose of illustration that cell 61 had a red filter in front of it, and it was desired to use the red to knock down the blue. In this instance, cell 62 or 64 would be arranged to provide the blue filter current since that would be the cell adjacent to the red cell in point of excitation and wherein the current would be 180° out of phase.

In case it was desired to use the output from one of the cells when the current is in phase with another cell to knock down the current in the other cells, different arrangements could be made. For instance, assuming that the cell 61 was going to be used to knock down the cell 63 which is in phase with it. This would be accomplished by effecting a reversal of the amplifier for the cell 61 which connected the output from cell 61 into cell 63. This could be effected by a double-pole-double-throw switch which would reverse the connections from the amplifier.

Still another system of control may be effected by the medium of the four beam mask and the cell unit having the double rows of cells illustrated in Figs. 9 and 10. In this instance, the cells to the left could be used for the red, green, blue and black printers in the manner previously described for making straight separation negatives and the cells to the right could be used to oppose any of the currents generated by the first mentioned cells since the filters of the other four cells could be prearranged to provide the desired out of phase current.

Of course it will also be apparent that by these controls the permutations and combinations which may be effected by my system are unlimited. For instance, a control can be effected over the signal to decrease the amplitude to either one of the exposure units and thus drop out the lower end of the exposure scale; or conversely the amplitude can be increased to bring up the lower end of the exposure scale and compress the high lights. This would be particularly useful for reproducing detail in shadows and compressing the over-all range of the picture. Still other controls can be effected by changing the light intensity.

These are but a few of the elements that are under the control of the operator and may be effected by a comparatively simple adjustment.

These controls may all be effected, particularly where the out-of-phase voltages are used, to buck or knock down the other by a suitable selective switching arrangement disposed in the "mixer" panel as indicated in Fig. 1. In this instance it will be noted that each of the amplifiers 71 to 74 inclusive is connected by a cable into the mixer and suitable controls are provided on the mixer for connecting either amplifier into the other.

Having thus described my invention in an embodiment thereof, I am aware that numerous and extensive departures may be made therefrom without departing from the spirit or scope of the invention.

I claim:

1. An apparatus for making color separation negatives, including a scanning unit and a plurality of exposure units, said scanning unit comprising an objective lens system for picking up an image of a spot being scanned, means for taking the composite beam and converting it into a pair of beams each having the same components as the original beam; means for swinging said beams; a plurality of photocells disposed in the path of said beams and energized thereby, said photo cells being connected to said exposure units to control said exposure units.

2. An apparatus for making color separation negatives including a scanner for scanning a colored subject and a plurality of exposure heads controlled by said scanner, said scanner including a source of light, means to concentrate the light source in a single beam, means to pick up the light from said picture and means to convert the beam into two beams each having the same components as the original beam, an oscilloscope for swinging said beams, a plurality of photo electric cells disposed in the path of said beams, said oscilloscope swinging said beams over said cells and said cells being energized proportional to the intensity of said beams and a plurality of optical units connected to and controlled by said cells said optical units having means to expose a light sensitive material according to the current output of said cells.

3. The method of making color separation negatives from a colored picture which comprises generating a light having predetermined spectral qualities, collecting said rays of light and forming them into a beam of small area at its focus and using said beam to scan said picture, picking up the rays of said beam from said scanned picture and converting the single beam into a pair of beams, each of which contains all the spectral colors of the single beam and each of which beams is formed to provide a beam of predetermined area and formation and spaced from the other beam at least by the width of one of the beams, swinging said beams simultaneously and converting said beams into separate electrical currents, each of which is proportioned to the color in a predetermined part of the spectrum and using said currents to control the exposure of the color separation negatives.

4. The method of making color separation negatives which comprises scanning a colored picture to be reproduced with a single beam of light, converting said single light beam into a pair of beams each of which is composed of the colors of the original, swinging said beams simultaneously and converting said beams into separate currents each proportioned to a predetermined part of the spectrum and using each of said currents to control the exposure of separate negatives.

5. The method of making color separation negatives which comprises scanning a colored picture with a light containing all the primary colors, picking up the resultant light from said picture as a single beam and converting the light from a single beam to more than one beam having a predetermined form and area, causing said beams to swing simultaneously and converting each beam into alternating currents each of which is proportioned to selected spectral components of the picture and using the separate currents to control the exposure of separate negatives.

6. The method of making color separation negatives from a colored picture which comprises scanning the colored picture with a single beam of light containing the primary colors of the visible spectrum, converting said single beam into more than one beam, each being spaced from the other and containing all of the colors of the original beam and each being formed to a predetermined shape and area, swinging said beams simultaneously and causing said swinging beams to be converted into electric currents, each of which is proportional to a predetermined portion of the spectral light and using the currents to control the exposure of separate images on a light sensitive material.

7. A scanning unit for making color separation negatives comprising a lens system for scanning a spot on a colored picture and converting the light rays from said spot into a beam, means interposed in the path of said beam to convert it into a pair of beams, said means comprising a mask formed with a pair of apertures, an oscilloscope disposed in the path of said beams for swinging the beams in an arc at a predetermined frequency, a plurality of photo cells and said beams being swung across said cells to generate separate currents in said cells.

8. A scanning unit for scanning a colored picture for making color separation negatives, comprising a lens system arranged to view a small spot in a picture and collect light rays from said spot into a single beam, an oscilloscope including a movable member for reflecting and swinging said beam, said lens system focusing said rays to a small spot on said oscilloscope mirror, a mask interposed in said beam ahead of said oscilloscope and breaking up the rays of said beam into separate beams, a plurality of photo cells juxtaposed to each other in a common plane and arranged to be sensitive to certain predetermined parts of the spectrum, said lens system imaging said mask apertures on said cells and each of said images being movable over one pair of said cells.

9. An apparatus for making color separation negatives including a scanner for scanning a colored original and a plurality of exposure units for exposing a light sensitive material to provide separate negatives, said scanner including a light source having its spectral quality affected by the picture being scanned, means for picking up the rays of light from said picture including a lens system, a beam forming mask for converting the rays of light transmitted by said lens system into a pair of spaced beams each of which contains the same proportional spectral qualities as the original, an oscilloscope for reflecting and swinging said beams, a photo cell unit for controlling said exposure heads comprising a plurality of photo cells arranged in a row in the line of travel of the swinging beams, each of said cells being sensitive to a predetermined spectral quality of light, said oscilloscope arranged to swing said beams over said cells, and said cells and said beams being so arranged and positioned that said beams fall on pairs of alternately spaced cells during each part of the swing to provide a current output from each cell.

10. An apparatus for making color separation negatives including a scanner for scanning a colored original and a plurality of exposure units for exposing a light sensitive material to provide separate negatives, said scanner including a light source for projection through or on the picture being scanned, means for picking up the rays of light passing through or reflected from said picture including a lens system focused on a spot on the picture, means for converting the rays of light transmitted by said lens system into a pair of spaced beams each of which contains the same proportional spectral qualities as the original, an oscilloscope for reflecting and swinging said beams, and means for energizing said oscilloscope at a predetermined frequency, a photo cell unit for controlling said exposure heads comprising a plurality of photo cells arranged in a row in the line of travel of the swinging beams from said oscilloscope, each of said cells being sensitive to a predetermined spectral quality of light, said oscilloscope arranged to swing said beams over said cells, and said cells and said beams being so arranged and positioned that said beams fall on pairs of alternately spaced cells during each part of the swing to provide a voltage output from each cell, the output of two of said cells being 180° out of phase with the output of the other cells.

11. An apparatus for making color separation negatives including a scanner for scanning a colored original and a plurality of exposure units for exposing a light sensitive material to provide separate negatives, said scanner including a light source arranged to have its spectral quality affected by the picture being scanned, means for picking up the rays of light from said picture including a lens system focused on a spot on the picture, means for converting the rays of light transmitted by said lens system into a pair of spaced beams each of which contains the same proportional spectral qualities as the original, an oscilloscope for reflecting and swinging said beams, a photo cell unit for controlling said exposure heads comprising a plurality of photo cells arranged in a common plane and parallel to each other, each of said cells being sensitive to a predetermined spectral quality of light, said oscilloscope arranged to swing said beams over said cells, and said cells and said beams being so arranged and positioned that said beams fall on pairs of alternately spaced cells during each part of the swing to provide a voltage output from each cell, the output of two of said cells being 180° out of phase with the output of the other cells.

12. An apparatus for making color separation negatives including a scanner for scanning a colored original and a plurality of exposure units for exposing a light sensitive material to provide separate negatives, said scanner including a light source arranged to have its spectral quality affected by the picture being scanned, means for picking up the rays of light from said picture including a lens system focused on a spot on the picture, means for converting the rays of light transmitted by said lens system into a pair of spaced beams each of which contains the same proportional spectral qualities as the original, an oscilloscope for reflecting and swinging said beams and means for swinging said oscilloscope at a predetermined frequency comprising an oscillator having a sine wave output, a photo cell unit for controlling said exposure heads comprising a plurality of photo cells arranged in a row in the line of travel of the swinging beams, each of said cells being sensitive to a predetermined spectral quality of light, said oscilloscope aranged to swing said beams over said cells, and said cells and said beams being so arranged and positioned that said beams fall on pairs of alternately spaced cells during each maximum part of the sine wave swing to provide a current output from each cell, which is one-half a sine wave and the amplitude of which is determined by the percentage of light intensity falling thereon, the output of two of said cells being 180° out of phase with the output of the other cells and amplifiers for amplifying the output of the cells and converting the current to a full sine wave and a mixer for mixing said out of phase currents to effect an exposure control proportional to the amount of mixed currents.

13. An apparatus for making color separation negatives including a scanner for scanning a colored original and a plurality of exposure units for exposing a light sensitive material to provide separate negatives, said scanner including a light source cooperating with the colored picture to provide a scanning light the spectral quality of which is controlled by the picture being scanned, means for picking up said rays of light from the picture including a lens system focused on an elemental spot of the picture, a beam forming mask for converting the rays of light transmitted by said lens system into beams each of which contains the same spectral qualities and which are a function of the original, an oscilloscope for reflecting and swinging said beams, and means for energizing said oscilloscope at a predetermined frequency comprising an oscillator having an alternating output, means for controlling said exposure units comprising a plurality of photo cells arranged in a common plane and in a row in the line of travel of the swinging beams from said oscilloscope, each of said cells being sensitive to a predetermined spectral quality of light, said oscilloscope arranged to swing said beams over said cells, and said cells and said beams being so arranged and positioned that said beams fall on pairs of alternately spaced cells during each maximum part of the alternating swing to provide a voltage output from each cell, which is one-half an alternation and the amplitude of which is controlled by the percentage of light intensity falling thereon, the output of two of said cells being 180° out of phase with the output of the other cells, and amplifiers for amplifying the output of the cells and converting the current to a full sine wave, and a mixer for mixing said out of phase currents to effect an exposure control determined by the relative amount of mixed currents or voltages.

14. An apparatus for making color separation negatives including a scanner for scanning a colored original and a plurality of exposure units for exposing a light sensitive material to provide separate negatives, said scanner including a light source arranged to have its spectral quality affected by the picture being scanned, means for picking up the rays of light from said picture including a lens system focused on a spot on the picture, means for converting the rays of light transmitted by said lens system into a pair of spaced beams each of which contains the same proportional spectral qualities as the original, an oscilloscope for reflecting and swinging said beams, a photo cell unit for controlling said exposure heads comprising a plurality of photo cells, means to selectively determine the spectral sensitivity of each of said cells, said oscilloscope arranged to swing said beams over said cells, and said cells and said beams being so arranged and positioned that said beams fall on pairs of alternately spaced cells during each part of the swing to provide a voltage output from each cell, the output of two of said cells being 180° out of phase with the output of the other cells.

15. An apparatus for making color separation negatives from a colored original, including a scanning unit for scanning the original and a plurality of exposure units for exposing the negatives, said scanning unit including a lens system for picking an image of a spot on the colored original to provide a beam, means for converting the beam into a plurality of beams each having like spectral components and proportional to the components of the original beam, a plurality of photo cells and means for swinging said beams across said cells to excite the cells and said cells being connected to said exposure units to control the exposure thereby.

16. An apparatus of the class described including a scanning unit for scanning a colored original and a plurality of exposure units for exposing separation negatives, said scanning unit including means for picking up rays of light from said original and forming them into a beam, means for converting said beam to a plurality of beams and means for swinging said beams, a plurality of light responsive elements adapted to be excited by said beams and means for selectively determining the spectral response of each of said elements, said elements being connected to the exposure units to control the exposure thereby.

17. The method of scanning a picture which comprises scanning the picture with a single beam of light, picking up the light from said picture and converting it into a pair of spaced beams the colors of each of which is a function of the original beam, oscillating said beams, converting each of said beams into separate alternating currents each representative of a desired color causing some of said currents to be out of phase with others of said currents and employing said currents to control the reproduction of a picture.

18. A scanner for scanning a picture including a light source for illuminating the picture, a drum for supporting the picture and means for concentrating the light from the scanner into an elemental spot on the drum, means for picking up said light and converting it into currents including a lens system receiving rays of light from said spot and converting it into a beam of light, a mask formed with a pair of apertures of predetermined form and area and means whereby said lens system directs said light from said beam through the mask in a diffused state, said mask arranged to break the single light beam into a pair of beams, a second lens and an oscilloscope having a mirror positioned thereon for reflecting and swinging said beams, a photo electric cell element having a plurality of cells disposed in the path of travel of the swinging beams, said second lens system arranged to image the apertures in said mask on said cell bank.

19. An apparatus of the class described including a scanning unit for scanning a colored original and a plurality of exposure units for exposing separation negatives, said scanning unit including means for picking up rays of light from said original and forming them into a single beam, means for converting said beam into a pair of beams comprising a mask formed with a pair of spaced apertures therein, means for swinging said beams, a plurality of spaced photo electric cells disposed in the path of travel of said beams, said cells being arranged to receive the light from said beams during alternate portions of the swinging thereof and means electrically connecting said cells to said exposure units to control the same.

20. The method of scanning a picture which comprises moving the picture and shining an uninterrupted light thereon, viewing the picture to pick up light from an elemental spot and forming the same into a single beam, transforming said single beam into more than one beam the spectral components of each of which are a function of the spectral components of the original beam, oscillating said beams, converting the varying light quantities of the beams into electrical currents which are a function of the quality of light in the beams by interposing means in the path of said beams to provide a continuous uninterrupted scanning of the pictures.

21. The method of making color separation negatives which comprises scanning the picture with a beam of light, converting said beam after scanning into more than one beam the color components of each beam being a function of the original, swinging said beams and converting said beams into separate alternating currents each of the same frequency and each being proportioned to predetermined spectral color components, causing some of said currents to be out of phase with the others and utilizing said separate currents to control the exposure of separate negatives, and utilizing at least one of said out-of-phase currents as a control with one of said other currents in the exposure of at least one of said negatives.

LOUIS A. THOMPSON.